Oct. 15, 1968  MICHIO FUKANO ET AL  3,405,451

LIQUID BALLISTIC FOR GYROCOMPASSES

Filed Sept. 10, 1965

INVENTORS
Michio Fukano
Takeshi Hojo

Fig. 5-A
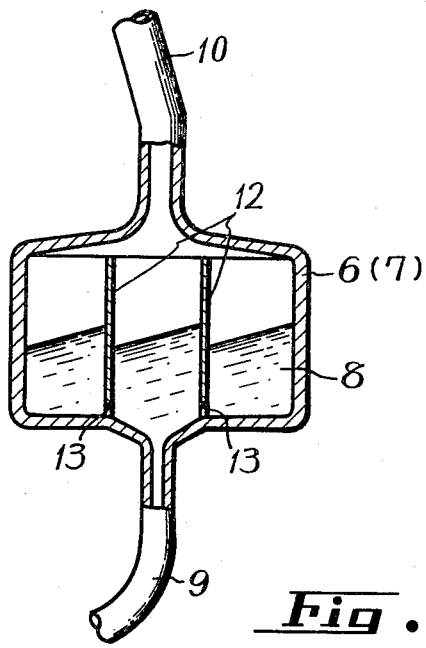
Fig. 5-B
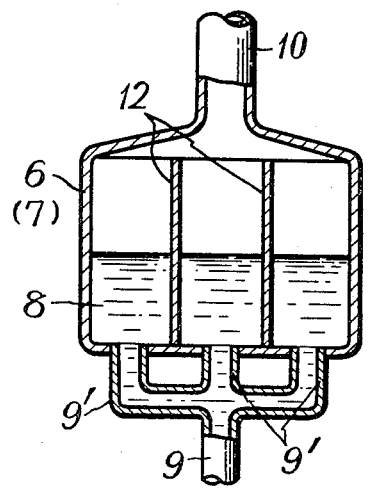
Fig. 5-C
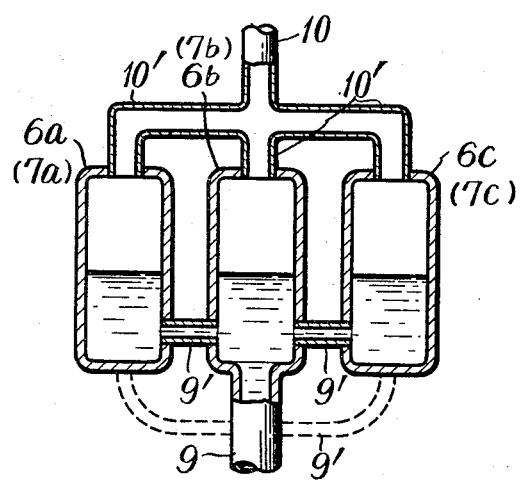
INVENTORS
*Michio Fukano*
*Takeshi Hojo*

United States Patent Office 3,405,451
Patented Oct. 15, 1968

3,405,451
LIQUID BALLISTIC FOR GYROCOMPASSES
Michio Fukano, Yokohama-shi, and Takeshi Hojo, Tokyo, Japan, assignors to Kabushikikaisha Tokyo Keiki Seizosho (Tokyo Keiki Seizosho Co., Ltd.), Ohta-ku, Tokyo, Japan, a corporation of Japan
Filed Sept. 10, 1965, Ser. No. 486,464
Claims priority, application Japan, Sept. 14, 1964, 39/52,731
4 Claims. (Cl. 33—226)

ABSTRACT OF THE DISCLOSURE

Rolling or pitching errors in gyrocompasses due to the deviation of the center of gravity of the liquid containers used in the gyrocompasses are eliminated or avoided by dividing the liquid containers into a north-south series of intercommunicating compartments. Flow of the liquid between the compartments is controlled, however, by apertures whose size is determined in accordance with design criteria based on the particular liquid used and the expected movement of the gyro.

BACKGROUND OF THE INVENTION

Field of the invention

This invention relates to improvements in a liquid ballistic for gyrocompasses and more particularly to a liquid ballistic which minimizes its error due to the movements, such as rolling and pitching for example, of the craft on which the instrument is mounted.

Description of the prior art

As is well known in the art, the ballistic of the gyrocompass serves to cause the gyro to seek the meridian and is indispensable to the gyrocompass. The ballistic comprises a pair of pots and a pipe interconnecting them and this ballistic is mounted directly on the gyro case or on the supporting member thereof which tilts with the gyro spin axis. The pots contain therein a liquid such, for example, as mercury or the like which is of relatively great specific gravity. Furthermore, the pots are usually interconnected through an air pipe, which is not always necessary in practice.

With such a ballistic, the north-seeking action of the gyro is carried out accurately by the flow of the liquid between the two pots without producing any torque other than that for the north-seeking action.

The inherent period of such a known ballistic depends primarily on fluid friction of the liquid with the pipe interconnecting the two pots and the specific gravity of the liquid. The liquid of the ballistic is moved in response to the rolling and pitching periods of the craft on which the gyrocompass is mounted. Where the direction of such movements of, for example, a ship, is not just east-west nor north-south, the vertical component of a torque is produced about the gyro vertical axis by one period of the movement of the ship, causing errors in the gyro. In order to avoid such errors, the torque component about the vertical axis can be eliminated by making the inherent period of the ballistic coincident with the periods of the movements of the ship. However, even if the liquid does not flow into one pot from the other, the surface of the liquid in the pots is inclined by the horizontal acceleration due to the rolling and pitching of the ship to thereby cause transfer of the center of gravity of the liquid with the result that errors occur.

SUMMARY OF THE INVENTION

Accordingly, it is the principal object of this invention to provide a liquid ballistic for gyrocompasses which enables elimination of errors of the gyrocompass caused by movements such, for example, as the rolling or pitching of a craft.

It is another object of this invention to provide a liquid ballistic for gyrocompasses which is simple in construction and accurate in operation by providing a plurality of rooms in each pot of said ballistic of the gyrocompass and interconnecting said rooms by passages through which a liquid flows.

It is a further object of this invention to provide a liquid ballistic for gyrocompasses in which a chemically stable liquid other than mercury such as oil can be used in said ballistic.

Other objects, features and advantages, of this invention will become apparent from the following description taken in conjunction with the accompanying drawings, in which:

BRIEF DESCRIPTION OF THE DRAWINGS

FIGURES 5A to 5C are embodiments of the ballistic produced according to this invention.

DESCRIPTION OF THE PREFERRED EMBODIMENTS

Figure 1:
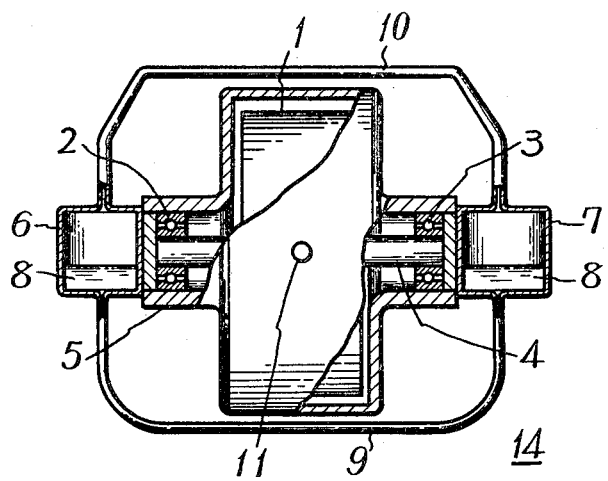
FIGURE 1 is the longitudinal sectional view of a gyrocompass along the spin axis thereof, for explaining the principle of the gyrocompass.

Referring to the drawings, the present invention will be described in detail. In FIGURE 1 reference numeral 1 identifies a gyro rotor, which is housed in a rotor case 5. Both ends of its spin axis 4 are supported by the rotor case 5 by means of ball bearings 2 and 3 and the rotor 1 is adapted to rotate at high speed. Reference numeral 11 indicates a horizontal axle of the gyro. The prior art ballistic comprises two pots 6 and 7 containing therein a liquid 8 and the pots 6 and 7 are disposed at the north and south ends of the rotor case 5, these pots being interconnected through a pipe 9 as illustrated. When the rotor spin axis 4 lies horizontal as shown in the figure, the liquid 8 suitably fills the pots 6 and 7 and completely fills the pipe 9, too. In the illustrated embodiment the pots 6 and 7 are interconnected through an air pipe 10, permitting free circulation of air between the two pots. When the liquid 8 fills the two pots 6 and 7 equally, the center of gravity of the instrument remains at the center thereof.

If now the ballistic 14 tilts with respect to the horizontal axis 11 of the gyro, the liquid 8 flows to the lower pot and transfer of the center of gravity is thereby caused to produce a torque about the horizontal axis 11, causing the gyro to precess. By application of some damping action the rotor spin axis 4 of the gyro rotor 1 is controlled to always settle in the meridian as in known types of gyrocompasses.

Figure 2:
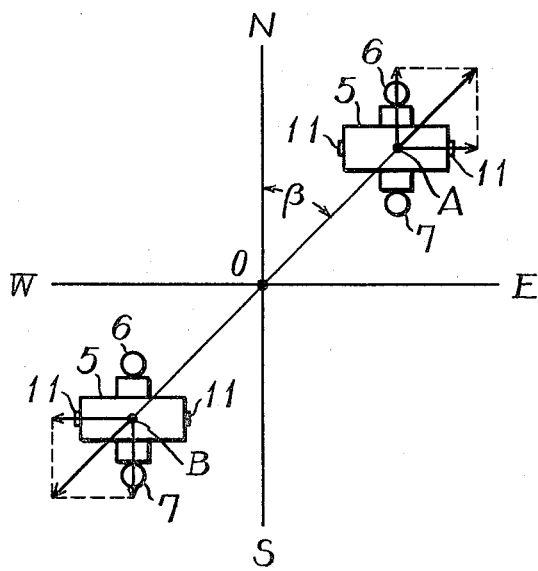
FIGURE 2 is an explanatory diagram of acceleration vectors of the movements such as the rolling and pitching of a ship.

FIGURE 2 is an explanatory diagram of acceleration vectors in the case where the instrument illustrated in FIGURE 1 is subjected to the movements such as the rolling and pitching of the ship on which the instrument is mounted. Such movements of the ship have many directions and periods and they can be expressed in the form of a composition of sine waves produced in the respective directions of the movements. In FIGURE 2, for the sake of simplicity, there is shown one of the composite sine waves applied in that direction in which the ship is rocked at an angle of β with respect to the meridian. This sine wave can be divided into vectors of the north-south and east-west directions of the spin axis 4 of the gyro rotor. In this case, the east-west component represents the force which moves the instrument about the center of the rolling or pitching. On the other hand, the north-south component is a force which only accelerates the gyro without producing any variations in the tilt angle about the horizontal axis, being restricted by the characteristics of the gyro. Accordingly, the liquid 8 of the ballistic flows in the opposite direction to which acceleration has been applied.

Figure 3:
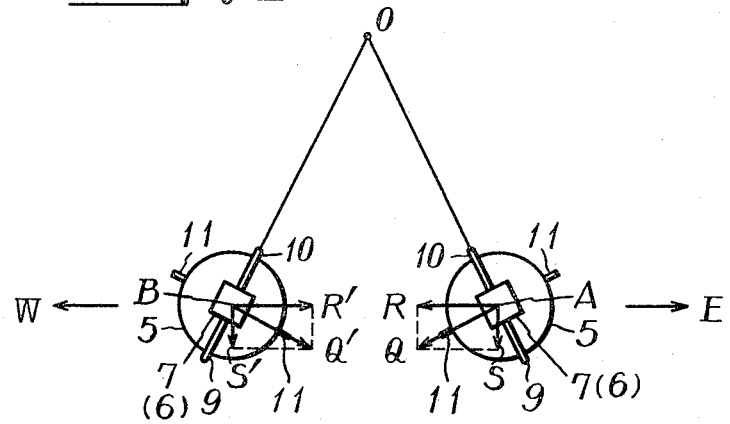
FIGURE 3 is an explanatory diagram viewed from the south in FIGURE 2.

FIGURE 3 is a diagram viewed from the south in FIGURE 2, illustrating the gyro case and the ballistic 14 moving about the center of the rolling or pitching.

Figure 4:
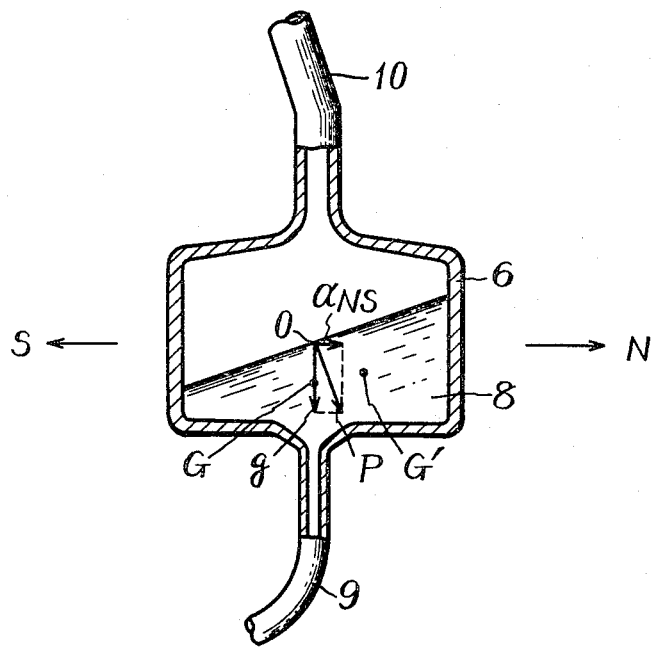
FIGURE 4 is a cross-sectional view showing the condition of a liquid contained in the pot of a known ballistic when acceleration has been applied thereto.

FIGURE 4 illustrates the state of the pot 6 of the ballistic 14 when the gyro has been swung out to the point A in FIGURE 2. For convenience's sake, in this example only changes in the surface of the liquid 8 in the pot 6 will be discussed on the assumption that no flow of the liquid 8 between the pots 6 and 7 is caused due to the resistance of the pipe 9. In this case the surface of the liquid becomes normal to the sum vector OP of the acceleration αNS and the acceleration of gravity of the earth g. At the same time the center of gravity of the liquid in the pot naturally shifts from G to G' and, as a result of this, a torque is produced about the horizontal axis 11 by the transfer of the center of gravity, producing in the gyro a torque of such a vector as represented by the arrow AQ in FIGURE 3. Where the gyro is swung out to the point B in FIGURE 2, the transfer of the center of gravity due to the change of the surface of the liquid produces a torque vector such as shown by the arrow BQ'. These torques represented by vectors AQ and BQ' which are applied to the gyro by the transfer of the center of gravity of the liquid can be divided into horizontal and vertical components. The horizontal components AR and BR' are opposite in direction so that they are cancelled by each other in every period, while both of the vertical components AS and BS' are downward and they are not cancelled by each other. Thus, the downward vectors or torques produced every period of the swing remain and they cause errors in the gyro. Therefore, it is considered that the errors are caused by synchronization of the transfer of center of gravity of the liquid in the pot with the movement such, for example, as the rolling or pitching of the ship.

In view of the foregoing, in one embodiment of the present invention a pair of pots 6 and 7 of the ballistic are each divided into more than two cavities, rooms, receptacles or compartments by the provision of generally east-west partition walls 12. Liquid flow control means in the form of holes 13 are made in the partition walls 12 at the lower portions thereof, interconnecting the cavities in a manner such that the liquid 8 may freely flow in and out of each cavity or room. With such an arrangement, it is possible to decrease the transfer of center of gravity of the liquid in the pots due to acceleration which causes errors in the gyro as described in the foregoing. In this case, it is necessary to suitably select the flowing time constant of the liquid 8 flowing through the holes 13. The flowing time constant depends on the number of the cavities, the diameter of the holes 13, the viscosity of the liquid 8 and so on. That is, the liquid 8 is caused to flow in and out of the cavities through the holes 13 by the rolling or pitching of the ship, but the flow of the liquid through the holes 13 can be sufficiently controlled with respect to the rolling or pitching period of the ship by selecting a suitable flowing time constant of the liquid 8.

The above embodiment employs as the liquid 8 a material such as fluoric resin oil which is relatively low in specific gravity and high in viscosity. In case of using mercury which is greater in specific gravity and lower in viscosity than the aforementioned liquid, the flowing period of mercury between adjacent cavities is made to coincide with the period of the movement such as the rolling or pitching of ship, by which errors due to the transfer of the center of gravity of the liquid can be prevented.

The rolling and pitching periods of ships depend on their size, weight and so on. In many ships of the present day the rolling and pitching periods are in the ranges from 5.0 to 25 seconds and from 2.0 to 15 seconds respectively. In one form of the ballistic of this invention designed for use in almost all ships of the present day, the pipe 9 is 4 mm. in inner diameter and 310 mm. in length, and the pots 6 and 7 are formed in a tubular configuration having an inner diameter of 60 mm. and being divided into three cavities by two generally east-west partition walls 12 disposed substantially in parallel to a diameter of the pots 6 and 7. The partition walls 12 each have at the lower portion thereof a hole 13 having a diameter of 2 mm. A fluoric resin oil referred to as Daifloil having a specific gravity of 2 and a viscosity of 5 cs. (25° C.) is employed as the liquid 8, the flouric resin oil filling the pots 6 and 7 about ⅓ of their entire volume, and the specific flowing time constant of the liquid 8 is selected about 3 seconds. It was found that a maximum error of a conventional gyro was 2.0° or so, while that of a gyro having the ballistic of this invention was 0.3° under the same conditions. As is apparent from this, the precision of the gyro can be greatly improved by the application of this invention.

In practice, ships of, for example, several tens of tons have about 5 seconds as the period of movements such as rolling and pitching. In such a case the error due to transfer of the center of gravity in the pots may be controlled to be about ⅓ of that obtained with the conventional gyro ballistics by selecting the sectional area of the holes 13 of the partition walls 12 so that the flowing time constant of the liquid 8 between the divided cavities may be approximately 2.5 seconds. The period of movements such as rolling and pitching of ships of 200,000 tons is 20 seconds or so. In such a case, the error can similarly be reduced to about ⅓ of that obtained with the conventional gyro ballistics by selecting the flowing time constant of the liquid to be about 9 seconds.

Furthermore, it was found that where the flowing of liquid 8 through the holes 13 is periodic as in the case of using mercury, errors caused by movements such as the rolling and pitching of ships can be maintained within a permissible limit by selecting the number of the divided cavities, the diameter of the holes, the viscosity of the liquid and so on in such a manner that the flowing period of the liquid through the holes may be in the range between 2.0 to 25 seconds.

The foregoing explanation has been made in connection with a case where the cavities are interconnected through the holes 13 made in the partition walls 12 disposed in the pots 6 and 7. On the other hand, each of the pots 6 and 7 may be completely divided into three cavities by the partition walls without the provision of the holes therein and in this case the cavities are connected to the pipe 9 through liquid flow control means in the form of auxiliary pipe means 9' so as to permit free flowing of the liquid 8 between adjacent cavities, as illustrated in FIGURE 5B.

In some cases, each of the pots 6 and 7 comprises a plurality of small individual containers 6a, 6b, 6c and 7a, 7b, 7c as shown in FIGURE 5C, and these containers are respectively interconnected through the auxiliary pipes 9' as illustrated by the solid line in the figure or the auxiliary pipes 9' are connected directly to the pipe 9 as shown by the broken line in the figure. In such a case, the air pipe 10 is connected to each of the separate containers through an auxiliary air pipe 10', as illustrated.

The term "pot" as used herein thus embraces not only the type of subdivided vessel exemplified in FIGURES 5A and 5B, but also a group of interconnected individual small vessels arranged serially in the north-south direction, exemplified in FIGURE 5C.

Ballistics for known types of gyrocompasses employ as the liquid 8 mercury having a high specific gravity but in this invention it is preferred to use a liquid such, for example, as oil which is lower in specific gravity than mercury. That is, in the case of using mercury, sufficient north-seeking action of the gyro can be obtained, even if the base area of the pots of the ballistic is small. However, mercury is easily oxidized as is well known and the oxide is precipitated on the surface to thereby block the pipe interconnecting the pots, so that the north-seeking action of the gyro cannot be carried out accurately. In addition, since mercury is readily combined with other metal to produce amalgam as is well known, the ballistic must be made of a material such as stainless steel which is difficult to be combined with mercury, and hence the price of the ballistic inevitably rises.

In the present invention, however, the use of a liquid such as oil is very efficient which has a smaller specific gravity than mercury. That is, it is true that the base area of the pots of the ballistic must be increased a little because oil is smaller in specific gravity than mercury, but the provision of the partition walls in the pots enhances efficiency of the gyro, as compared with conventional types of gyros provided with ballistics using mercury but having no such partition walls in the pots. In addition, the surfaces of mercury in the two pots do not coincide exactly with each other due to its large surface tension as would be the case with oil, so that the precision of the north-seeking action of the gyro can be improved by the use of oil. Since oil is stable chemically, the ballistic can be made of a material such as aluminum or the like which is less expensive and easier to make. Accordingly, it is preferred to use oil rather than mercury which has been employed in the art hitherto.

However, reference to oil should not be construed as excluding the use of mercury and the efficiency of the ballistic using mercury can be enhanced by application of this invention.

It will be apparent that many modifications and variations may be effected without departing from the scope of the novel concepts of this invention.

What we claim is:
1. A liquid ballistic for gyrocompasses comprising a pair of pots and a pipe interconnecting said pair of pots, each of the pots of said pair consisting of a plurality of receptacles arranged serially in the north-south direction, each said receptacle having a bottom and sides, each said pot having a liquid flow control means intercommunicating with said receptacles and restricting the liquid flow between the receptacles in each of said pots so that errors due to deviation of the center of gravity of the liquid in the pot will be reduced.

2. A liquid ballistic for gyrocompasses according to claim 1 wherein the receptacles are compartments formed by the provision of partition walls in the pots, said walls forming a side of each compartment, said compartments having a predetermined relatively small opening in a lower portion of a side thereof.

3. A liquid ballistic for gyrocompasses according to claim 1 wherein the receptacles are compartments formed by the provision of a plurality of partition walls and wherein the flow control means is a pipe interconnected to the bottom of the compartments.

4. A liquid ballistic for gyrocompasses as claimed in claim 1, wherein each of said pots consists of a plurality of small containers and said plurality of containers are interconnected at the lower portion thereof by means of liquid pipes having a small diameter, while at the upper portion thereof by means of air pipes.

References Cited

UNITED STATES PATENTS

| | | | |
|---|---|---|---|
| 1,362,940 | 12/1920 | Harrison et al. | 33—226 |
| 1,679,438 | 8/1928 | Mills | 33—226 |
| 1,686,524 | 10/1928 | Hight | 33—226 |
| 1,709,395 | 4/1929 | Gillmor | 33—226 |
| 1,811,415 | 6/1931 | Harris | 33—226 |
| 1,923,885 | 8/1933 | Rawlings | 33—226 |
| 2,070,923 | 2/1937 | Richter | 33—226 |
| 2,922,228 | 1/1960 | Davis | 33—226 |

ROBERT B. HULL, *Primary Examiner.*